(12) United States Patent
Oukassi et al.

(10) Patent No.: US 9,429,808 B2
(45) Date of Patent: Aug. 30, 2016

(54) ELECTROCHROMIC DEVICE

(71) Applicant: Commissariat a l'Energie Atomique et aux Energies Alternatives, Paris (FR)

(72) Inventors: Sami Oukassi, Saint Egreve (FR); Christophe Dubarry, Claix (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 0 days.

(21) Appl. No.: 14/800,184

(22) Filed: Jul. 15, 2015

(65) Prior Publication Data

US 2016/0018712 A1 Jan. 21, 2016

(30) Foreign Application Priority Data

Jul. 16, 2014 (FR) ...................................... 14 56844

(51) Int. Cl.
*G02F 1/15* (2006.01)
*G02F 1/155* (2006.01)

(52) U.S. Cl.
CPC ............. *G02F 1/1523* (2013.01); *G02F 1/155* (2013.01); *G02F 2001/1502* (2013.01)

(58) Field of Classification Search
CPC ................ G02F 1/1523; G02F 1/155; G02F 2001/1502
USPC ................................... 359/265–275; 345/105
See application file for complete search history.

(56) References Cited

U.S. PATENT DOCUMENTS

| 4,521,081 A | 6/1985 | Miyake et al. |
| 7,238,451 B2 * | 7/2007 | Frech ................. B01D 67/0088 429/307 |
| 7,265,890 B1 | 9/2007 | Demiryont |

FOREIGN PATENT DOCUMENTS

| EP | 0584147 B1 | 9/1996 |
| EP | 1696261 A1 | 8/2006 |
| WO | 2008055824 A1 | 5/2008 |

OTHER PUBLICATIONS

Monk, P.M.S., R.J. Mortimer, and D.R. Rosseinsky. Electrochromism and Electrochromic Devices.New York: Cambridge University Press, 2007.

* cited by examiner

*Primary Examiner* — Tuyen Tra
(74) *Attorney, Agent, or Firm* — St. Onge Steward Johnston & Reens LLC

(57) ABSTRACT

An electrochromic device including a substrate, an electrolyte placed between a first optically-active electrochromic electrode and a second optically-passive electrochromic electrode, and a quantity X of cations. The first electrode is capable of storing a quantity of cations equal to Y while the second electrode is capable of storing a quantity of cations equal to Z. The first electrode and the second electrode are respectively associated with a first current collector and with a second current collector. The device includes a quantity of cations X such that Y<X<0.30 Z.

16 Claims, 1 Drawing Sheet thickness (micrometers)

ELECTROCHROMIC DEVICE

FIELD OF THE INVENTION

The present invention relates to an electrochromic device comprising an electrolyte positioned between two electrochromic electrodes. This device comprises cations by a quantity smaller than the maximum storage capacity of the materials forming the optically-passive storage electrode.

The fields of use of the present invention particularly comprise screens, reversible display devices, active glass.

BACKGROUND OF THE INVENTION

Generally, an electrochromic device is capable of modulating the optical properties (transmittance and/or reflectance and/or absorbance) when an electric field is applied thereacross. More specifically, it comprises at least one active electrochromic electrode capable of reversibly changing optical state on application of an electric charge.

A conventional electrochromic device generally comprises a substrate (1) on which are successively deposited (FIG. 1):
a first current collector (2);
a first electrochromic electrode (3);
an electrolyte (4);
a second electrochromic electrode (5); and
a second current collector (6).

As already indicated, at least one of these electrochromic electrodes is optically active, which enables to modulate the optical properties of an electromagnetic radiation (7).

The electrochromic materials used to form an optically-active electrode may be organic, inorganic, or hybrid. Their nature allows a change of optical state, either by cation insertion, or by cation extraction.

Such an optical state change is obtained by application of an electric field across the electrochromic device.

As already indicated, electrochromic devices comprise two electrochromic electrodes. Typically, the second electrochromic electrode enables to store cations. It may be transparent, whatever the cation flow. It may also act as a complementary electrode and have an optical state (transparent, colored . . . ) identical to that of the first electrode but with an inverse cation flow.

Electrochromic devices having this second type of configuration (complementary electrode) are generally preferred, given that they improve the optical perception of the change of optical state (contrast). For example, the first electrode may be made of a $WO_3$ material while the second electrode may be made of NiO. This couple of materials allows the following electrochemical reactions:

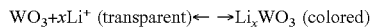

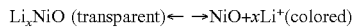

The performance of electrochromic devices is particularly assessed by means of the following indicators:
contrast: the difference between the maximum and the minimum of the optical response of the device, expressed in terms of percentage between two values, often of transmission or reflection. The higher the contrast, the more effective the device is considered.
optical density: the quantity of charges to be brought to the system to switch, that is, to pass from the minimum state to the maximum state or conversely. This corresponds to the efficiency of the transformation of the optical behavior by the quantity of injected charges. For a given charge, the greater the optical transformation, the more effective the device is considered.
switching time: the time necessary for the device to ensure the passing from one optical state to another, which is fixed for a given contrast. The shorter the switching time, the more effective the device is considered.

Typically, the switching time is one of the major limitations of prior art electrochromic devices. It may generally vary from a few tens of seconds to a few minutes according to the architecture of the device and to the materials used.

All-solid electrochromic devices operating by insertion of cations ($Li^+$ for example) within inorganic materials may have relatively long switching times. Indeed, $Li^+$ cations are less mobile than protons. Further, an all-solid electrolyte has a lower ion conductivity than a liquid electrolyte. Accordingly, the cation migration kinetics is slower, which lengthens the switching time.

As an example, document U.S. Pat. No. 7,265,890 describes an all-solid inorganic electrochromic device operating by insertion of $Li^+$ cations in the infrared range. It comprises a first electrochromic electrode, an electrolyte, and a second transparent electrochromic electrode behaving as an $Li^+$ cation storage electrode.

Such an electrochromic device is typical of prior art configurations. The second electrochromic electrode is a transparent cation storage electrode, which is thus optically passive. Generally, it has a cation storage capacity larger than that of the first electrochromic electrode forming the active electrode.

Typically, the quantity of cations ($Li^+$ for example) injected into the storage electrode corresponds to the maximum capacity of cations which can be reversibly inserted into the available thickness and de-inserted therefrom.

The saturation of the storage electrode enables to compensate for a possible loss of cations during the cycling (insertion irreversibility). It further enables to improve the chemical stability of the device by anticipating the possible oxidation of part of the cations, which might cause a failure of the device.

Anyhow, the cation switching time in such electrochromic devices is not satisfactory The present invention aims at solving this technical problem for any type of electrochromic device and, in particular, in all-solid inorganic electrochromic devices.

SUMMARY OF THE INVENTION

While prior art electrochromic devices optimize the cation storage capacities of the materials forming the electrodes, the Applicant has discovered that the use of only part of this storage capacity enables to decrease the switching time, and thus to accelerate the switching from one optical state to another. Such an optical state change is advantageously obtained by application of an electric field across the electrochromic device.

The electrochromic device according to the present invention comprises an electrolyte positioned between two electrochromic electrodes, and cations capable of displacing between a first optically-active electrode and a second optically-passive electrode, and this, under the effect of an electric field applied between said electrodes. The first optically-active electrode is responsible for the change of optical state on application of an electric field across the electrochromic device. Thus, due to this first optically-active electrode, the electrochromic device can modify the optical properties of an electromagnetic radiation.

Such an electrochromic device comprises a quantity of cations smaller than the maximum quantity capable of being stored by the electrode materials. On the contrary, the electrode materials of prior art devices are saturated with cations. Such a cation decrease enables to decrease the switching time of cations and thus improves the properties of the device.

More specifically, the present invention aims at an electrochromic device comprising a substrate, an electrolyte placed between a first optically-active electrochromic electrode and a second optically-passive electrochromic electrode, and a quantity X of cations. The first electrochromic electrode of this device is capable of storing a quantity of cations equal to Y while the second electrochromic electrode is capable of storing a quantity of cations equal to Z. Further, the first electrode and the second electrode are respectively associated with a first current collector and with a second current collector.

This electrochromic device is characterized in that it comprises a quantity of cations X such that $Y<X<0.30\ Z$.

Quantity X of cations is advantageously smaller than $0.20\ Z$, and ore advantageously still smaller than $0.15\ Z$.

Quantity X of cations is thus in the range from (reversible) saturation value Y of the first optically-active electrode, and a maximum threshold value corresponding to 30% of (reversible) saturation of the second optically-passive electrode, the saturation value of the second electrode being Z. This characteristic enables to clearly distinguish this device from prior art devices, which comprise the largest possible quantity of cations generally corresponding to the saturation of electrode materials. The present invention enables to optimize the switching speed of the electrochromic device by increase of the cation diffusion and of the electronic conductivity of the optically-passive electrode.

Saturation means the maximum quantity of cations capable of being reversibly inserted and de-inserted in a given thickness of an electrode material. The maximum quantity of cations (saturation) of a material is generally expressed in capacity ($\mu Ah$). The theoretical values are well known in the state of the art for all insertion materials.

Above-mentioned quantities Y and Z correspond to the capacities of the first electrode and of the second electrode, respectively.

Further, quantity X of cations corresponds to the quantity of cations injected into the electrochemical chain, except for the cations present in the material forming the electrolyte, the cation balance of exchanges within the electrolyte being zero.

More specifically, quantities X, Y, and Z are defined as follows:

X corresponds to the total quantity of cations. In other words, it is the quantity of cations injected into the electrochemical chain, except for the cations present in the material forming the electrolyte.

Y corresponds to the quantity of cations capable of being stored by the first electrochromic electrode (capacity). In other words, it is the quantity of cations necessary to reversibly obtain an optimum change of optical state.

Z corresponds to the quantity of cations capable of being stored by the second electrochromic electrode (capacity). In other words, it is the quantity of saturation cations of the second electrochromic electrode.

The substrate of the electrochromic device may particularly be made of a material selected from the group comprising glass; sapphire; ZnS; ZnSe; silicon; germanium; polymeric materials such as, in particular, Kapton® (imide-based polymer), PET (poly(ethylene terephthalate)), PEN (poly ethylene naphthalate); mica (ore from the silicate group mainly comprising aluminum potassium silicate); and ceramic.

Advantageously, the substrate has a thickness which may be in the range from 20 micrometers to 1,000 micrometers, more advantageously from 50 micrometers to 200 micrometers.

In the device according to the present invention, the first optically-active electrode is associated with the first current collector. The second electrochromic electrode is associated with the second current collector. According to this configuration, each of the two electrodes is in contact with the electrolyte.

The current collectors (first and second) are, advantageously and independently from each, other made of a material capable of being selected form the group comprising indium tin oxide (ITO); aluminum zinc oxide (AZO); transparent conductive oxides (TCO), particularly $SnO_2$, $F:SnO_2$, $In_2O_3$, ZnO; and metal such as, in particular, aluminum, tungsten, molybdenum, or nickel.

Advantageously, the first current collector and the second current collector have, independently from each other, a thickness which may be in the range from 50 to 500 nanometers, more advantageously from 150 to 300 nanometers.

The two current collectors are electrically interconnected by a circuit external to the electrochromic device. Such a connection by means of terminals enables to apply an electric field.

In the device according to the present invention, the first electrochromic electrode is optically active. In other words, it allows the optical modulation and thus ensures the optical state switching which corresponds to the insertion or the extraction of cations.

The first optically-active electrochromic electrode is advantageously made of a material capable of being selected from the group comprising tungsten oxide $WO_3$; titanium oxides $TiO_x$; tantalum oxides $TaO_x$; molybdenum oxides $MoO_x$; and niobium oxides $NbO_x$.

The second electrochromic electrode is optically passive. It is a storage electrode. It has a neutral optical state on insertion and on extraction of cations.

The second electrochromic storage electrode (optically passive) is advantageously made of a material capable of being selected from the group comprising vanadium oxide $V_2O_5$; $CeVO_4$; $CeO_2$; and $CeO_2$—$SiO_2$. It advantageously is $V_2O_5$.

The capacity (Y, Z) of electrochromic electrodes depends on the nature of the materials used, but also on their thickness.

Thus, the first electrochromic electrode has a thickness which may advantageously be in the range from 0.2 to 1 micrometer, more advantageously from 0.3 to 0.6 micrometer.

Further, the second electrochromic electrode has a thickness which may advantageously be in the range from 0.05 to 0.5 micrometer, more advantageously from 0.1 to 0.3 micrometer.

The cations used may in particular be metal cations (advantageously of an alkaline metal) or protons. They are advantageously selected from the group comprising $Na^+$; $Li^+$; and $H^+$.

The electrochromic device further comprises an electrolyte having a thickness advantageously in the range from 0.2 to 2 micrometers, more advantageously from 0.5 to 1.5 micrometer.

In the case where the cations of the electrochromic device are $Li^+$ cations, the electrolyte separating the two electrochromic electrodes may in particular be made of a material selected from the group comprising lithium phosphorus oxynitride (LiPON); $LiNbO_3$; $LiAlF_4$; $Li_3N$ (lithium nitride); LZTO (lanthanum zinc tin oxide); LAGP (lithium aluminum germanium phosphate); LiSiPON (lithium silicon phosphorus oxynitride); LiBON (lithium oxynitride); and LiSON (lithium sulfur oxynitride).

According to a particularly advantageous embodiment, the electrochromic device is an all-solid inorganic device advantageously having $Li^+$ cations as cations.

According to a specific embodiment, the electrochromic device according to the present invention successively comprises:
a substrate;
a first current collector;
a first electrochromic electrode, advantageously made of $WO_3$;
an electrolyte;
a second electrochromic electrode, advantageously made of $V_2O_5$;
a second current collector.

According to another specific embodiment, the first electrode and the second electrode may be inverted. The electrochromic device then successively comprises:
a substrate;
a second current collector;
a second electrochromic electrode, advantageously made of $V_2O_5$;
an electrolyte;
a first electrochromic electrode, advantageously made of $WO_3$;
a first current collector.

The present invention also relates to a method of preparing the above-described device.

According to a specific embodiment of the invention, this method comprises the steps of:
depositing a first current collector on a substrate;
depositing on the first current collector a first electrochromic electrode capable of storing a quantity of cations equal to Y;
depositing an electrolyte on the first electrochromic electrode;
depositing on the electrolyte a second electrochromic electrode capable of storing a quantity of cations equal to Z;
introducing a quantity X of cations such that Y<X<0.30 Z;
depositing a second current collector on the second electrochromic electrode.

The step of introducing quantity X of cations may be carried out during the deposition of the second electrode, or just after, advantageously during the deposition.

According to another specific embodiment of the invention, the method comprises the steps of:
depositing a second current collector on a substrate;
depositing on the second current collector a second electrochromic electrode capable of storing a quantity of cations equal to Z;
introducing a quantity X of cations such that Y<X<0.30 Z;
depositing an electrolyte on the second electrochromic electrode;
depositing on the electrolyte a first electrochromic electrode capable of storing a quantity of cations equal to Y;
depositing a first current collector on the first electrochromic electrode.

The step of introducing quantity X of cations may be carried out during the deposition of the second electrode, or just after, advantageously during the deposition.

The layers of materials forming the electrochromic device may be deposited by techniques belonging to the general knowledge of those skilled in the art, particularly by PVD/CVD, spin coating, sol-gel deposition.

Further, it will be within the abilities of those skilled in the art to select the adapted precursors to prepare the different layers of materials forming the electrochromic device.

The cations may in particular be introduced by electrochemical lithiation; by dry Li metal evaporation lithiation; or by deposition by sputtering of a target with $Li_xWO_3$, for example.

The use of the above-described electrochromic device also pertains to the present invention. The concerned fields of application particularly target screens, reversible display devices, active glass, thermal and radiative flow control; and aeronautics.

The invention and the resulting advantages will better appear from the following non-limiting drawings and examples, provided as an illustration of the invention.

DETAILED DESCRIPTION OF THE INVENTION

Figure 1:
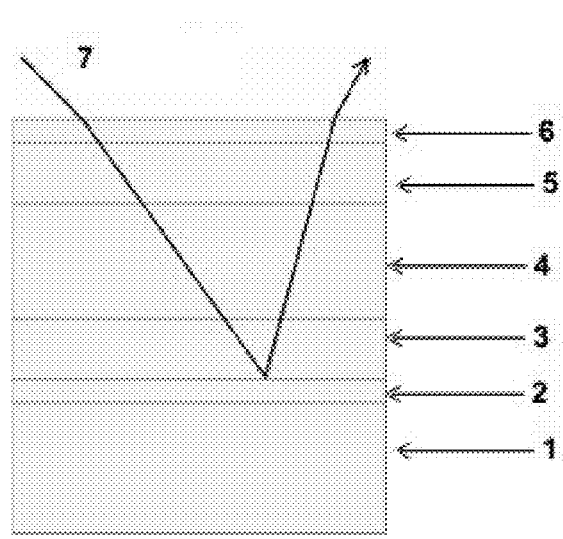
FIG. 1 shows a conventional electrochromic device.

Two electrochromic devices having the architecture illustrated in FIG. 1 have been prepared. They comprise $Li^+$ cations, and an all-solid configuration comprising the stacking of:
a glass substrate (1);
a first current collector (2) made of ITO (indium tin oxide);
a first active electrochromic electrode (3) made of $WO_3$;
an electrolyte (4) made of LiPON (lithium phosphorus oxynitride);
a second passive storage electrochromic electrode (5) made of $V_2O_5$;
a second current collector (6) made of ITO (indium tin oxide).

Figure 2:
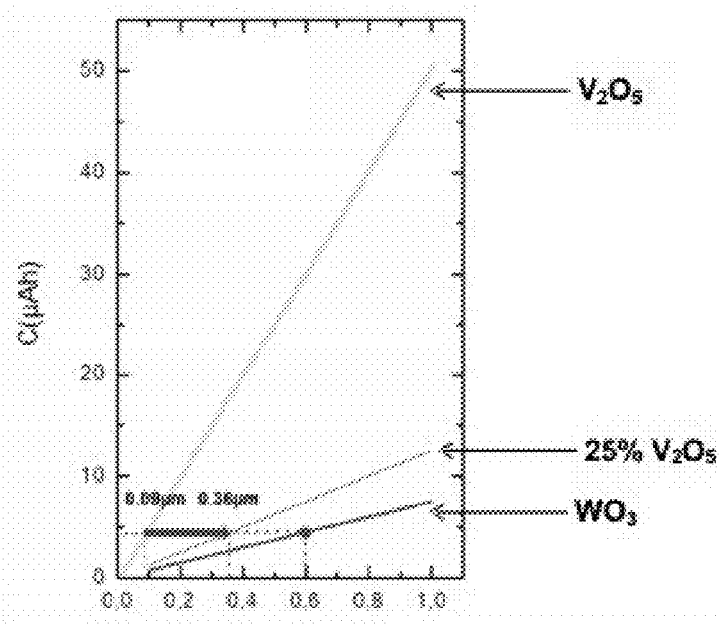
FIG. 2 corresponds to the capacity of electrochromic electrode materials according to their respective thickness.

FIG. 2 shows the different curves of variation of surface capacity C ($\mu Ah/cm^2$) of materials $V_2O_5$ and $WO_3$ according to their thickness.

The volumetric capacity values relative to the saturation with $Li^+$ cations, with an insertion reversibility, are equal to 50 $\mu Ah/cm^2/\mu m$ for material $V_2O_5$ and 7.5 $\mu Ah/cm^2/\mu m$ for material $WO_3$.

In this case, the thickness of the active $WO_3$ electrochromic electrode is 0.6 micrometers.

a) Prior Art Device:

To overcome possible cation losses, the transparent $V_2O_5$ storage electrode has a thickness greater than the thickness necessary to store the quantity necessary to saturate 0.6 micrometers of $WO_3$.

As shown in FIG. 2, the $V_2O_5$ layer thus has a thickness of at least 0.09 micrometers. The state of the art thus implies taking a larger value, for example, 200 nanometers of lithium $V_2O_5$ in the saturation state. Accordingly, when Z=50*0.2=10 $\mu Ah$ while Y=7.5*0.6=4.5 $\mu Ah$, Y<X=Z.

b) Device According to the Invention:

In this device, the $V_2O_5$ layer is only saturated up to 25% to take advantage of the fast diffusion kinetics as well as of the high electronic conductivity for a low insertion rate x in $Li_xV_2O_5$.

As shown in FIG. 2, to have the capacity necessary to saturate 0.6 µm of $WO_3$, while remaining at 25% of its saturation capacity, the $V_2O_5$ layer has a thickness of 0.36 micrometer instead of 0.09 for the above prior art device (100% $V_2O_5$ saturation).

Thus, for a $V_2O_5$ layer having a 0.4-µm thickness which is saturated at 25%, X=50*0.4*0.25=5 µAh; Y=7.5*0.6=4.5 µAh; and Z=50*0.4=20 µAh. Accordingly, Y<X<0.3 Z.

What is claimed is:

1. An electrochromic device comprising a substrate, an electrolyte placed between a first optically-active electrochromic electrode and a second optically-passive electrochromic electrode, and a quantity X of cations; the first electrode being capable of storing a quantity of cations equal to Y while the second electrode is capable of storing a quantity of cations equal to Z; the first electrode and the second electrode being respectively associated with a first current collector and with a second current collector, wherein the device comprises the quantity X of cations such that Y<X<0.30 Z.

2. The electrochromic device of claim 1, wherein Y<X<0.15 Z.

3. The electrochromic device of claim 1, wherein the first electrode is made of a material selected from the group consisting of tungsten oxide $WO_3$; titanium oxides $TiO_x$; tantalum oxides $TaO_x$; molybdenum oxides $MoO_x$; and niobium oxides $NbO_x$.

4. The electrochromic device of claim 1, wherein the second electrode is made of a material selected from the group consisting of vanadium oxide $V_2O_5$; $CeVO_4$; $CeO_2$; and $CeO_2$—$SiO_2$.

5. The electrochromic device of claim 1:
wherein the first electrode has a thickness in the range from 0.2 to 1 micrometer;
and wherein the second electrode has a thickness in the range from 0.05 to 0.5 micrometer.

6. The electrochromic device of claim 1, wherein the cations are cations selected from the group consisting of $Li^+$; $Na^+$; and $H^+$.

7. The electrochromic device of claim 1, wherein the cations are $Li^+$ cations; and wherein the electrolyte is made of a material selected from the group consisting of LiPON; $LiNbO_3$; $LiAlF_4$; $Li_3N$; LZTO; LAGP; LiSiPON; LiBON; and LiSON.

8. The electrochromic device of claim 1, wherein the device is an all-solid inorganic electrochromic device having $Li^+$ cations as cations.

9. The electrochromic device of claim 1, wherein the device successively comprises:
the substrate;
the first current collector;
the first electrochromic electrode;
the electrolyte;
the second electrochromic electrode;
the second current collector.

10. The electrochromic device of claim 9, wherein the first electrochromic electrode is made of $WO_3$.

11. The electrochromic device of claim 9, wherein the second electrochromic electrode is made of $V_2O_5$.

12. The electrochromic device of claim 1, wherein the device successively comprises:
the substrate;
the second current collector;
the second electrochromic electrode;
the electrolyte;
the first electrochromic electrode;
the first current collector.

13. The electrochromic device of claim 12, wherein the second electrochromic electrode is made of $V_2O_5$.

14. The electrochromic device of claim 12, wherein the first electrochromic electrode is made of $WO_3$.

15. A method of preparing the electrochromic device of claim 1, wherein the method comprises the steps of:
depositing a first current collector on a substrate;
depositing on the first current collector a first electrochromic electrode capable of storing a quantity of cations equal to Y;
depositing an electrolyte on the first electrochromic electrode;
depositing on the electrolyte a second electrochromic electrode capable of storing a quantity of cations equal to Z;
introducing a quantity X of cations such that Y<X<0.30 Z during or after the deposition of the second electrochromic electrode;
depositing a second current collector on the second electrochromic electrode.

16. A method of preparing the electrochromic device of claim 1, wherein the method comprises the steps of:
depositing a second current collector on a substrate;
depositing on the second current collector a second electrochromic electrode capable of storing a quantity of cations equal to Z;
introducing a quantity X of cations such that Y<X<0.30 Z during or after the deposition of the second electrochromic electrode;
depositing an electrolyte on the second electrochromic electrode;
depositing on the electrolyte a first electrochromic electrode capable of storing a quantity of cations equal to Y;
depositing a first current collector on the first electrochromic electrode.

* * * * *